Oct. 31, 1961    R. W. SEBASTIAN    3,007,081
ELECTRONIC FLASH UNIT
Filed Dec. 14, 1959
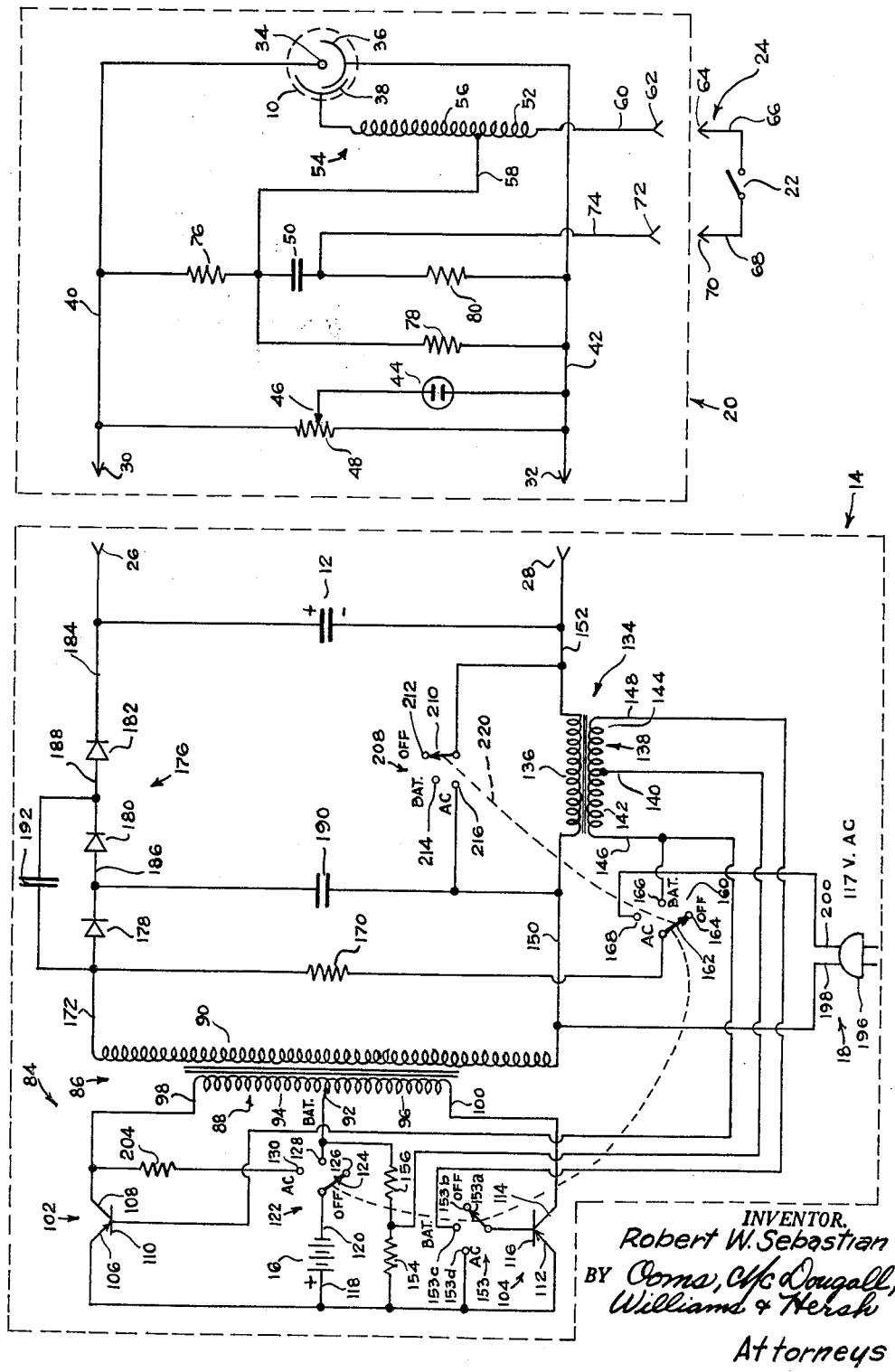
INVENTOR.
Robert W. Sebastian
BY Ooms, McDougall,
Williams & Hersh
Attorneys 3,007,081
ELECTRONIC FLASH UNIT
Robert W. Sebastian, Lombard, Ill., assignor, by mesne assignments, to American Gage & Machine Company, Chicago, Ill., a corporation of Illinois
Filed Dec. 14, 1959, Ser. No. 859,458
2 Claims. (Cl. 315—205)

This invention relates to a new and improved electronic flash unit adapted to provide brilliant flashes of light in synchronization with the operation of a camera shutter.

One object of the present invention is to provide a new and improved electronic flash unit in which transistors are employed in an oscillator or inverter circuit, so that a high voltage may be derived from a low voltage battery to charge the main capacitor of the flash unit.

A further object is to provide a new and improved flash unit of the foregoing character in which the feedback for operating the inverter circuit is obtained from a transformer which carries the charging current of the main capacitor, so that the amount of feed-back will be maximum at the beginning of the charging interval of the capacitor, and will steadily decrease as the capacitor is charged, so as to reduce the current drain on the battery when the capacitor has been discharged.

Further objects and advantages of the present invention will appear from the following description, taken with the accompanying drawings in which the single figure is a schematic wiring diagram showing the electrical circuit of an electronic flash unit, to be described as an illustrative embodiment of the present invention.

The illustrated flash unit is of the type having a gaseous discharge lamp or tube 10 which is adapted to produce a brilliant flash of light when a capacitor 12, charged to a high voltage, is discharged through the lamp. Between flashes, the capacitor 12 is recharged by a power supply 14, which may derive its power either from a self-contained battery 16 or an alternating current power cord 18 adapted to be connected to an ordinary commercial supply of alternating current, which may be at 117 volts and 60 cycles. The arrangement of the illustrated flash unit is such that the battery 16 may be recharged when the flash unit is being operated on alternating current.

As shown, the flash unit is made in two parts, comprising the power supply 14, already referred to, and a lamp head 20, containing the gaseous flash lamp 10 and other components. The lamp 10 may be flashed under the control of an external switch 22, which may be of the type commonly built into a camera shutter so as to be synchronized with the operation of the shutter. A shutter cord 24 extends between the switch 22 and the lamp head 20. In this case, the main flash capacitor 12 is mounted in the power supply unit 14.

The illustrated lamp head 20 is adapted to plug into the power supply 14. Thus, the power supply 14 is equipped with receptacle contacts 26 and 28, which are adapted to receive plug prongs 30 and 32 on the lamp head 20. The contacts 26 and 28 are connected to the opposite sides of the main capacitor 12. The capacitor 12 may be of a high value, such as 250 microfarads, for example. The capacitor 12 may be adapted to withstand a high charging voltage, on the order of 450 volts, for example.

The illustrated flash lamp 10 has an anode 34, a cathode 36, and a control electrode 38. By means of leads 40 and 42, the anode 34 and the cathode 36 are connected to the prongs 30 and 32. Thus, the main capacitor 12 is normally connected directly between the anode 34 and the cathode 36.

A small neon lamp 44 may be employed to indicate the voltage across the flash lamp 10, so that the user will know when the capacitor 12 has been recharged sufficiently to flash the lamp. In this case, one side of the neon lamp 44 is connected to the movable contact 46 of a potentiometer 48 which is connected between the leads 40 and 42. The other side of the lamp 44 is connected to the lead 42. The potentiometer 48 provides an adjustment of the voltage at which the lamp 44 lights. The potentiometer 48 may be made of a high value, such as 1.5 megohms so as to draw a minimum of current.

Various arrangements may be provided to initiate the discharge in the lamp 10. In this case, the closure of the shutter switch 22 is arranged to discharge a capacitor 50 through the primary portion 52 of a step-up auto-transformer 54. As shown, the auto-transformer 54 has a secondary portion 56 which is connected to the control electrode 38. Thus, an extremely high voltage will be impressed on the control electrode 38 when the switch 22 is closed. This voltage will ionize the gas in the tube 10, with the result that the capacitor 12 will discharge between the anode 34 and the cathode 36.

One primary lead 58 of the auto-transformer 54 is connected to one side of the capacitor 50. The other primary lead 60 is adapted to be connected to the other side of the capacitor 50 by a series circuit comprising a receptacle contact 62, a plug prong 64, a lead 66, the shutter switch 22, a lead 68, a plug prong 70, a receptacle contact 72, and a lead 74. The leads 66 and 68 constitute the shutter cord 24. The plug prongs 64 and 70 may readily be disconnected from the receptacle contacts 62 and 72.

The capacitor 50 is adapted to be charged by a voltage divider arrangement comprising resistors 76 and 78 connected in series between the leads 40 and 42. The primary lead 58 and one side of the capacitor 50 are connected to the junction between the resistors 76 and 78. A resistor 80 is connected between the other side of the capacitor and the lead 42, to control the charging time of the capacitor. The capacitor 50 may be of a low value, such as .25 microfarad. The resistors 76, 78 and 80 may be of high values, such as 4.7, 3.9 and 3.9 megohms, respectively, to minimize the current drain from the main capacitor 12.

The battery 16 is normally a compact storage battery, which may be of the nickel-cadmium type. However, the battery 16 may comprise a series of dry cells, which, of course, are not rechargeable. For battery operation, the battery 16 is connected into an inverter or oscillator circuit 84, which comprises a power transformer 86 having a primary winding 88 and a secondary winding 90. Of course, the transformer 86 has a high step-up ratio so that the desired high voltage may be obtained for charging capacitor 12. The primary winding 88 has a center tap 92 which divides the winding into two portions 94 and 96, terminating in end leads 98 and 100.

The battery 16 is adapted to be connected alternately across the two primary portions 94 and 96 by means of electronic switch elements, which preferably take the form of transistors 102 and 104. The transistor 102 has an emitter 106, a collector 108 and a base 110. Similarly, the transistor 104 has an emitter 112, a collector 114, and a base 116. As shown, the emitters 106 and 112 are connected to the positive terminal 118 of the battery 16. The end leads 98 and 100 of the primary winding 88 are connected to the collectors 108 and 114, respectively. For battery operation, the center tap 92 of the primary winding 88 is connected to the negative terminal 120 of the battery by a three position control switch 122. It will be seen that the switch 122 comprises a movable contact 124 which is engageable with three successive fixed contacts 126, 128 and 130. The first contact 126 is dead and represents the off position of the switch, employed when the flash unit is shut down. The contact 128 represents the battery position and is connected to the center tap 92. The movable contact 124 is connected to the negative battery terminal 120. The contact 130 represents the position for alternating current operation and is connected in a manner to be described shortly.

The transistors 102 and 104 are controlled by feed-back derived from a small feed-back transformer 134 having a primary winding 136 and a secondary winding 138. The secondary 138 has a center tap 140 which divides the winding into two portions 142 and 144, terminating in end leads 146 and 148. For battery operation, the primary winding 136 carries the charging current of the capacitor 12. Thus, one side of the primary 136 is connected to one side of the secondary 90 by a lead 150. A lead 152 extends between the other side of the primary 136 and one side of the capacitor 12.

It will be seen that the end leads 146 and 148 of the feed-back transformer 134 are connected to the bases 110 and 116 of the transistors 102 and 104, the end lead 148 being connected to the base 116 through a switch 153. As shown, the switch 153 has a movable contact 153a which has three positions, in engagements with successive fixed contacts 153b, 153c and 153d. The contact 153b is dead and represents the off position of the switch. The transformer lead 148 is connected to the contact 153c, while the base 116 is connected to the movable contact 153a. It will be apparent that the contact 153d is connected to the emitter 112, for a purpose to be described in detail shortly, in connection with the alternating current operation of the flash unit. To provide biasing voltage for the transistors, the center tap 140 is connected to the junction of resistors 154 and 156, which are connected in series between the positive battery terminal 118 and the center tap 92. Thus, for battery operation, the resistors 154 and 156 are connected in series across the battery 16. The resistor 154 may be of a low value, such as 100 ohms while the resistor 156 may be of a considerably higher value such as 10,000 ohms. It will be apparent that the effect of the voltage dividing resistors 154 and 156 is to bias the bases 110 and 116 at a voltage which is slightly negative relative to the emitter voltage.

For battery operation, it is preferable to connect one end of the secondary winding 138 to one end of the secondary 90. This is done by a switch 160 having a movable contact 162 which is adapted to engage three successive fixed contacts 164, 166, and 168. A resistor 170 is connected between the movable contact 162 and one end lead 172 of the secondary 90. The contact 164 is dead and represents the off position of the switch. It will be apparent that the contact 166 is connected to the end lead 146 of the secondary winding 138. The contact 168 represents the alternating current position of the switch and is connected in a manner to be described shortly.

The feed-back from the transformer 134 causes the transistors 102 and 104 to oscillate, so that the transistors conduct alternately. The battery voltage is thus applied alternately to the two halves 94 and 96 of the primary 88. Thus, an alternating voltage of a high value is induced in the secondary winding 90.

The alternating current from the transformer secondary 90 is fed through a rectifier arrangement 176 in order to charge the capacitor 12 to a high voltage with direct current. In this case, the rectifier 176 comprises three diode rectifiers 178, 180 and 182 arranged in a voltage tripler circuit. Thus, the diodes 178, 180 and 182 are all connected in series between the lead 172 and a lead 184 which extends to the positive terminal of the main capacitor 12. All three diodes are polarized to conduct current toward the positive terminal of the capacitor 12. A junction lead 186 extends between the diodes 178 and 180. Similarly, a junction lead 188 extends between the diodes 180 and 182. A filter capacitor 190 is connected between the junction lead 186 and the transformer lead 150. It will be seen that a second filter capacitor 192 is connected between the junction lead 188 and the transformer lead 172. Each of the filter capacitors 190 and 192 may have a moderate value, such as 6 microfarads, for example.

As already indicated, the charging current of the capacitor 12 passes through the primary winding 136 of the transformer 134. The charging current has a pulsating component which induces an alternating feed-back voltage in the secondary winding 138. As the charge in the condenser 12 increases, the charging current decreases, with the result that the feed-back signal also decreases in magnitude. The feed-back signal approaches a minimum value as the capacitor 12 becomes fully charged. This reduction in the feed-back voltage reduces the current drain from the battery 16 after the capacitor 12 has been charged. For example, the battery drain may be reduced to only 60 milliamperes, from a 7.2 voltage storage battery, as compared with a drain of 250 milliamperes for previously known feed-back circuits. This reduction in battery current greatly increases the number of flashes that can be produced before the battery needs recharging.

For alternating current operation, the power cord 18 is connected to an ordinary household electrical outlet by means of a plug 196 connected to the end of the cord. It will be seen that the cord comprises leads 198 and 200. The lead 198 is connected to the lead 150, while the lead 200 is adapted to be connected to the lead 172 through the switch contacts 166 and 162 and the resistor 170. Thus, the alternating voltage from the power line is impressed between the leads 172 and 150. The alternating voltage is rectified by the rectifier circuit 176, so that the main capacitor 12 will be charged. The resistor 170 may be of a low value, such as 10 ohms, to minimize the peak rectifier current.

For alternating current operation, the switch contact 162 is engaged with the contact 168, as already indicated. The contact 124 is engaged with the contact 130. As shown, a resistor 204 is connected between the contact 130 and the transformer lead 98. Thus, the negative terminal 120 of the battery 16 is connected through the resistor 204 to the transformer lead 98. This connection is part of an arrangement whereby the battery 16 is charged when the electronic flash unit is operated from alternating current.

For alternating current operation, the switch contact 153a is engaged with the contact 153d. This connects the base 116 of the transistor 104 to the emitter 112, so that the transistor 104 will function as a rectifier, in series with the transformer winding 88, the battery 16 and the resistor 204. The transistor 102 is cut off and effectively out of the circuit for alternating current operation. It will be apparent that the transistor 104 operates as a half-wave rectifier to charge the battery 16. The resistor 204 limits the charging current. This resistor may have a fairly low value, such as 22 ohms.

For alternating current operation, the primary winding 136 of the feed-back transformer 134 is short-circuited by a switch 208, which has a movable contact 210 adapted to engage three successive fixed contacts 212, 214 and 216. It will be seen that the contacts 210 and 216 are connected to the opposite ends of the primary 136. These contacts are effective to short-circuit the primary 136 for alternating current operation. The other two contacts 212 and 214 remain unconnected.

The switches 122, 153, 162 and 216 are preferably ganged together for simultaneous operation by a common control shaft 220 or the like, represented by a broken line interconnecting the movable switch contacts 124, 153a, 162 and 210. All of the switches are shown in their off positions. The second position of each switch is the battery position, and the third is the alternating current position.

As already indicated, the most important advantage of the present invention arises in connection with battery operation, in which the feed-back circuit is effective to reduce the battery drain as the main capacitor 12 becomes fully charged. This action occurs because the feed-back circuit is responsive to the charging current through the capacitor 12. This charging current passes through the primary winding 136 of the feed-back transformer 134, which thus operates as a current transformer. The capacitor charging current is pulsating in character, with the result that an alternating feed-back voltage is induced in the secondary winding 138. This feed-back voltage causes the transistors 102 and 104 to conduct alternately. As the capacitor 12 becomes charged, the charging current decreases. This decreases the feed-back voltage, so that the battery current is decreased. The drain on the battery is thus greatly reduced during the interval between the recharging of the capacitor and the subsequent flash. It is thus possible to obtain many more flashes from the battery before it needs recharging.

Various modifications, alternative constructions and equivalents may be employed without departing from the true spirit and scope of the invention as exemplified in the foregoing description and defined in the following claims.

I claim:

1. In an electronic flash unit, the combination comprising a gaseous flash lamp, a capacitor connected across said flash lamp and adapted to be discharged therethrough, a means for charging said capacitor and including a battery, a step-up power transformer having a secondary winding and a primary winding, said primary winding having a center tap dividing said primary winding into two halves, rectifier means connected between said secondary winding and said capacitor, a pair of transistors connected between said battery and said primary winding for connecting said battery alternately across the halves of said primary winding, a feed-back transformer having a primary winding connected in series with said capacitor for carrying the charging current therethrough, said transistors having control electrodes for regulating conduction in said transistors, and a center tapped secondary winding on said feed-back transformer having opposite halves connected to said control electrodes of said transistors for producing conduction in said transistors alternately, said feed-back transformer being effective to reduce the feed-back as the capacitor charging current decreases with the charging of said capacitor, so as to reduce the current drain on said battery.

2. In an electronic flash unit, the combination comprising a gaseous flash lamp, a capacitor connected across said flash lamp and adapted to be discharged therethrough, means for charging said capacitor and including a step-up power transformer having a secondary winding and a center tapped primary winding, rectifier means connected between said secondary winding and said capacitor, a battery, a pair of electronic switch elements connected between said battery and said primary winding for connecting said battery alternately across the halves of said primary winding, and a feed-back transformer having a primary winding connected in series with said capacitor for carrying the charging current therethrough, said electronic switch elements having control electrodes for regulating conduction therein, said feed-back transformer having a balanced secondary winding connected to said control electrodes for producing conduction in said electronic switch elements alternately, said feed-back transformer being effective to reduce the current drain on said battery as said capacitor is charged.

References Cited in the file of this patent

UNITED STATES PATENTS 2,856,562    Grimm _____ Oct. 14, 1958

FOREIGN PATENTS 998,286    France _____ Jan. 16, 1952
953,991    Germany _____ Dec. 13, 1956

OTHER REFERENCES

"Transistor Photoflash Power Converters," H. A. Mamogian, Electronics Engineering Issue, August 29, 1958, pages 29, 30, 31.